United States Patent [19]
Johnson

[11] Patent Number: 5,131,727
[45] Date of Patent: Jul. 21, 1992

[54] AERODYNAMIC WHEEL COVER

[76] Inventor: Harold M. Johnson, 2903 Legion Ave. North, Lake Elmo, Minn. 55042

[21] Appl. No.: 614,861

[22] Filed: Nov. 16, 1990

[51] Int. Cl.$^5$ .............................................. B60B 7/02
[52] U.S. Cl. .............................. 301/37 P; 301/37 SA
[58] Field of Search ................ 301/37 R, 37 P, 37 SA

[56] References Cited

U.S. PATENT DOCUMENTS

| | | | |
|---|---|---|---|
| 3,565,489 | 2/1971 | Eirenberg et al. | 301/37 SA |
| 3,847,443 | 11/1974 | Laurion | 301/37 |
| 4,209,230 | 6/1980 | Perkins | 301/37 SA X |
| 4,620,749 | 11/1986 | McEachern | 301/37 |
| 4,660,893 | 4/1987 | Huntzinger | 301/37 SA |
| 4,681,647 | 7/1987 | Kondo et al. | 156/175 |
| 4,682,821 | 7/1987 | Strazis | 301/37 |
| 4,712,838 | 12/1987 | Berg et al. | 301/37 |
| 4,729,605 | 3/1988 | Imao et al. | 301/104 |
| 4,732,428 | 3/1988 | Monte | 301/63 |
| 4,741,578 | 5/1988 | Viellard | 301/63 |
| 4,836,615 | 6/1989 | Berg et al. | 301/37 |
| 4,969,693 | 11/1990 | Molson | 301/37 R |
| 4,978,174 | 12/1990 | Nosler | 301/37 R |

FOREIGN PATENT DOCUMENTS

| | | | |
|---|---|---|---|
| 168747 | 1/1921 | United Kingdom | 301/37 SA |

OTHER PUBLICATIONS

"Properties Cryovac D-940 Film," #S-06-20, Form 1584, W. R. Grace & Co.
"Cryovac D-940 Film," #S-06-20, Form 1583, W. R. Grace & Co.
"Mylar® LB, Summary of Properties" Form 195067A, DuPont.
"Mylar® HS, Summary of Properties," Form 194,150A, DuPont.
"Mylar® OL," Form H-36043, DuPont.
"Mylar® LBT-2, Summary of Properties," Form H-3336048, DuPont.
"Mylar® For Packaging, Summary of Properties," Type MMC, Form PBH, DuPont.
"Mylar® MB-P, Summary of Properties," Form 198116A, DuPont.
"Mylar® M-34, Summary of Properties," Form 202804A, DuPont.
"Mylar® For Packaging, Summary of Properties," Type 50 M-35, Form PBH, DuPont.
"Mylar® For Packaging, Summary of Properties," Type 50 M-44E, Form H-02951, DuPont.
"Mylar® M-45, Summary of Properties," Form 202805B, DuPont.
"Mylar® For Packaging, Summary of Properties," 75 M-45, Form PBH-6, DuPont.
"Mylar® For Packaging, Summary of Properties," Type 48 MM-20, Form E-71065, DuPont.
"Mylar® For Packaging, Technical Information Service, Type 48 MM-20," Form E-71066, DuPont.
"Mylar® For Packaging, Summary of Properties," Type 50 OL, Form PBH, DuPont.
"Mylar® 50 OL2, Summary of Properties," Form H-35232, DuPont.
"Mylar® For Packaging, Summary of Properties," Type 75 OL, Form H-02955, DuPont.
"Mylar® 75 OL 2, Summary of Properties," Type 75 OL 2, Form Jan. 30, 1991 PBH, DuPont.
"Mylar® 100 OL, Summary of Properties, Type 100

(List continued on next page.)

Primary Examiner—Russell D. Stormer
Attorney, Agent, or Firm—Merchant, Gould, Smith, Edell, Welter & Schmidt

[57] ABSTRACT

An aerodynamic wheel cover which includes a two sided circular cover, having an outer edge and an inner edge, and a central aperture. The wheel cover may be affixed by any number of adhesives deposited on one side of said aerodynamic wheel cover adjacent the wheel cover outer edge. The present invention also discloses a method of affixing the wheel cover of the present invention to wheels, the resulting wheels and vehicles.

29 Claims, 3 Drawing Sheets

OTHER PUBLICATIONS

OL (Was 100 XM-833)," Form Feb. 7, 1991 PBH, DuPont.

"Mylar® For Packaging, Summary of Properties," Type 100 OL-2, Form Jun. 2, 1989 PBH, DuPont.

"Mylar® For Packaging, Summary of Properties, Type 50 OLAF," Form Jan. 4, 1988 PBH, DuPont.

"Mylar® For Packaging, Summary of Properties, Type 100 OLAF," DuPont.

"Mylar® For Packaging, Summary of Properties, Type 150 OLAF," DuPont.

"Mylar® 50 RL-1, Summary of Properties," Form PBH Jul. 16, 1990, DuPont.

"Mylar® 50 RL-2, Summary of Properties," Form PBH Jul. 16, 1990, DuPont.

"Mylar® 50 RL-3, Summary of Properties," Form PBH Jul. 16, 1990, DuPont.

"Mylar® 50 XM-101, Summary of Properties," Form H-36037, DuPont.

"Mylar® 108 AF, Summary of Properties," Form PBH Nov. 14, 1990, DuPont.

"Mylar® For Packaging, Summary of Properties," Type 50 SM-829B, DuPont.

"Mylar® 50 XM 860, Summary of Properties," Form H-36049, DuPont.

"Mylar® For Packaging, Summary of Properties," Type 50 XM 873, Form PBH Apr. 1, 1988, DuPont.

"Mylar® 50 XM-918, Summary of Properties," Form PBH Jan. 16, 1991, DuPont.

"Mylar® For Packaging, Summary of Properties," Type 50 XM-924, Form PBH-2 Apr. 14, 1986, DuPont.

"Mylar® 50 MX-941, Summary of Properties," Form PBH Feb. 5, 1991, DuPont.

"Mylar® For Packaging, Summary of Properties," type 50 XM-963, DuPont.

"Mylar® 80 XM-101, Summary of Properties," Form H-36038, DuPont.

"Mylar® 80 XM-873, Summary of Properties," Form H-36036, DuPont.

"Mylar® 48 XMT-820, Summary of Properties," Form H-3520, DuPont.

"Mylar® 48 XM-LBA, Summary of Properties," Form H-36050-1, DuPont.

"Mylar® XMLBH, Summary of Properties," Technical Information Bulletin, DuPont.

"Mylar® XMLBH, Summary of Properties," Form H-36047, DuPont.

"Mylar® 150XM-963 AT, Summary of Properties, DuPont.

"Mylar® 100 XM-963A, Summary of Properties, DuPont.

"Mylar® 100XM-963, Summary of Properties, DuPont.

"Mylar® for Packaging, Summary of Properties, Type 100 XM-917," DuPont.

"Mylar® XM 108 AF, Summary of Properties, Type 50 XM108 AF," DuPont.

"More Than Just A Pretty Face, DuPont Mylar® MM-200" brochure, DuPont.

"Mylar® United States Price List, Effective May 6, 1991," DuPont.

"Packaging for Convenience Foods, Microwave Films, What's New, What's Coming" brochure, DuPont.

"Packaging For Convenience Foods, Microwave Food Packaging—What To Specify and How To Measure" brochure, DuPont.

"Mylar® LBT, Summary of Properties," Form 198117A, DuPont.

"Mylar® P-25, Summary of Properties," Form 194,129A, DuPont.

"Packaging For Convenience Foods, Current Product Trends In Microwavable Foods" brochure, DuPont.

"Mylar®, Summary of Properties," Form H-36042, DuPont.

"The Clarity and Sealability of Mylar™ Let Customers See Food Products In A New Way" color sheet, DuPont.

"These Were Created For Mylar® OL" color brochure, DuPont.

"These Were Created For Mylar® OL" color brochure, DuPont.

"Mylar® Summary of Properties," Form H-36040, DuPont.

"Mylar® For Packaging, Safety in Handling and Use," Form E-60736, DuPont.

"Mylar® Packaging Preview, Adoptions of Mylar® Polyester Film for Flexible Packaging" color sheet, DuPont.

"Mylar® Packaging Preview, Adoption of Mylar® Polyester Filme, Surlyn® Ionomer Resin and Elvax® Eva Resin For Flexible Packaging" color sheet, DuPont.

Bicycle Guide Advertisement, "New Pro Uni-Disc" p. 109.

AERODYNAMIC WHEEL COVER

FIELD OF THE INVENTION

This invention relates generally to light weight covers used to increase the aerodynamic properties of wheels. More specifically, the present invention relates to covers for wheels capable of creating an aerodynamic effect by reducing the friction or drag across the surface of a wheel created by air flow.

BACKGROUND OF THE INVENTION

Since the creation of wheels, man has sought various mechanisms to assist wheels in turning at a higher rate. Hubcaps or wheel covers have been used for years to provide ornamental decoration for wheels. Generally, mechanical means of attachment such as friction clips and screws have been used to attach the hubcap to the wheel rim. Traditionally, these approaches have not been used on two wheel vehicles such as motorcycles and bicycles as there is no effective means for attaching hubcaps to an axle that extends beyond the planar, cross-sectional thickness of the wheel rim. Moreover, the weight of hubcaps or wheel covers generally used in the automotive industry are not suitable for motor or human powered cycles.

Recently, composite wheels have become popular. While composite wheels may eliminate the use of spokes, they are costly and do not necessarily reduce the weight of the wheel or the energy necessary to initiate revolution. As a result, composite wheels do not always provide an adequate alternative to wheel covers as they may not be readily applicable to all uses in which spoke wheels may be found. Traditional spoke wheels are still the predominant wheel system for most two-wheeled vehicles.

In the past, various systems have been proposed for covering spoke wheels. For example, U.S. Pat. Nos. 4,712,838 and 4,836,615 to Berg et al discloses a clip-fastened disc cover for spoke wheels, which generally consists of a fabric or plastic cover having a hoop of semi-rigid material in a peripheral pocket of the cover. McEachern, U.S. Pat. No. 4,620,749, discloses a fabric or polymeric wheel cover which generally consists of a porous cover, having a central aperture for the wheel hub held on wheels by tension engagement with an opposing cover.

Laurion, U.S. Pat. No. 3,847,443, discloses an ornamental wheel element which is designed to fit between the spokes, inside a wheel. Strazis, U.S. Pat. No. 4,682,821, discloses a semi-rigid, tension attached bicycle wheel cover assembly intended to improve the aerodynamic efficiency of bicycle wheels. Monte, U.S. Pat. No. 4,732,478, discloses a streamlined wheel for bicycles which comprises two hollow half shells which are joined to create a rim for support of a tire. Imao et al, U.S. Pat. No. 4,729,605, and Viellard, U.S. Pat. No. 4,741,578, discloses spokes and wheel components useful in composite wheels.

However, these systems fail to disclose an inexpensive means of easily improving the aerodynamic properties of a spoke wheel with minimal manual effort. As can be seen, while any number of alternative wheel covers are available, these systems have certain shortcomings which have not yet been satisfied by the art.

SUMMARY OF THE INVENTION

The present invention provides a wheel cover which improves the aerodynamic properties of the hub-rim-spoke wheels. The wheel cover of the present invention is preferably made of a light weight synthetic or natural polymer, fabric or paper film which is adhesively applied to a wheel through simple manual application. In turn, the aerodynamic wheel cover of the present invention may also be easily removed and replaced to allow on-road repairs of spoke, hub, or rim.

Preferably, the wheel cover of the present invention may be easily applied without extended mechanical or manual effort merely by adhesively applying the cover to the wheel spokes or rim. Once in place, the wheel cover may be shrunk to size so as to provide a tightly fit cover.

In accordance with the present invention there is provided, an aerodynamic wheel cover comprising a two sided circular cover having an outer edge and an inner edge. The inner edge of the wheel cover borders a central aperture. Adhesive means is deposited on one side of the aerodynamic wheel cover adjacent to the wheel cover outer edge. Also disclosed are methods for applying the vehicle wheel of the present invention, and the resulting wheels as well as wheeled vehicles.

DETAILED DESCRIPTION OF THE PREFERRED EMBODIMENT

The present invention discloses a wheel cover, a method of applying the wheel cover, and resulting wheels and vehicles.

The Wheel Cover

Figure 1:
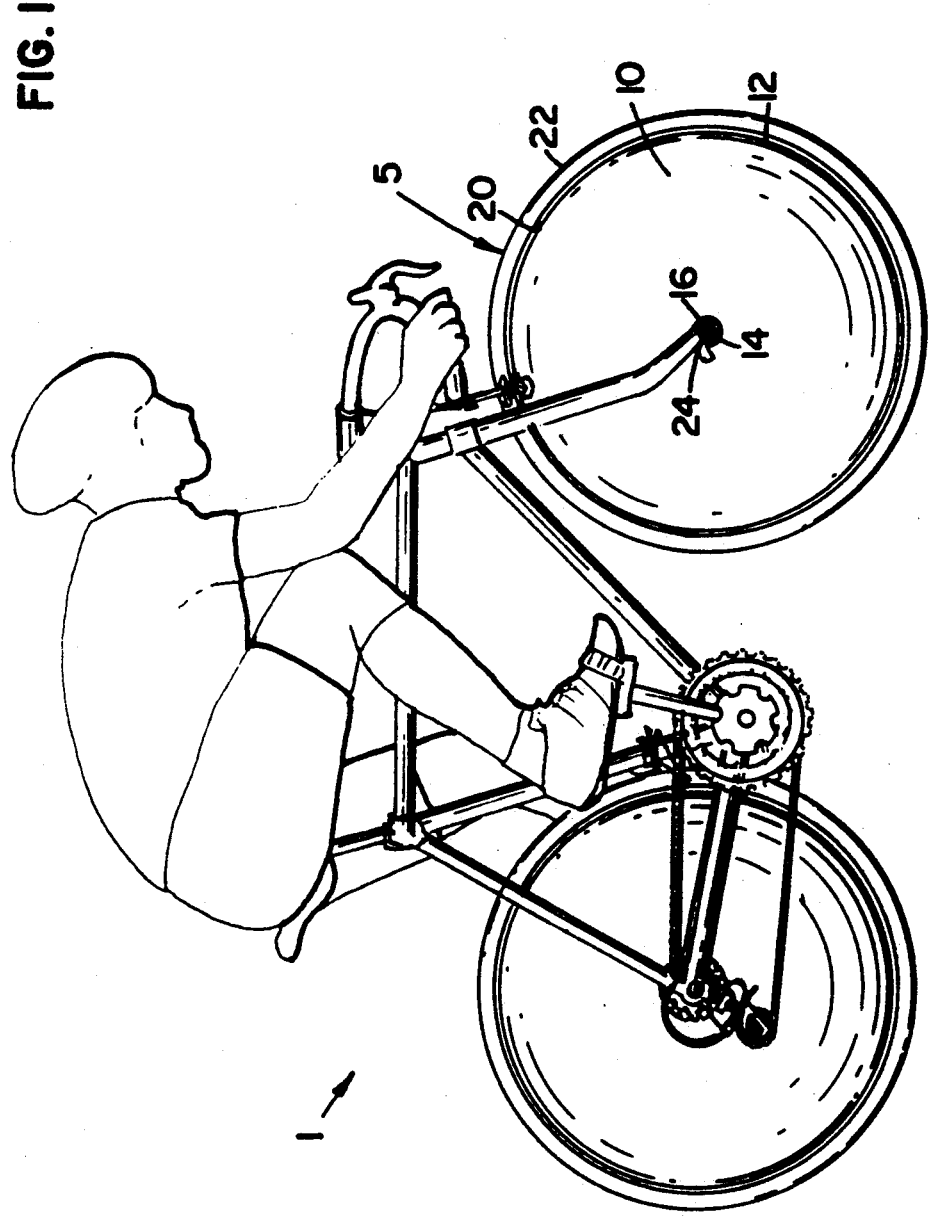
FIG. 1 is a side perspective view showing the wheel cover of the present invention in application on a bicycle wheel.

Turning to the figures, wherein like parts are designated by like numerals throughout several views, there is shown in FIG. 1 an aerodynamic wheel cover 10 in one environment of application, that is, applied to the wheels of a bicycle 1. The aerodynamic wheel cover 10 generally comprises a two sided circular element having an outer edge 12 and an inner edge 14. The inner edge 14 borders a central aperture 16. Deposited at the outer edge of one side of the aerodynamic wheel cover is an adhesive 11, FIG. 2. The adhesive 11 may generally be positioned adjacent to the wheel cover outer edge 12 to assist in affixing the wheel cover 10 to various elements of the wheel.

In accordance with the present invention, the wheel cover disclosed in FIGS. 1-5, generally functions to reduce wind flow through spokes and thereby reduce air or wind related drag as motion is initiated in a wheel. Preferably, the wheel cover 10 of the present invention functions as an inexpensive sheet or film which may be quickly applied over the surface of a hub and rim wheel such as a bicycle wheel.

While allowing fast application, the wheel cover of the present invention is adaptable to many applications. For example, the wheel cover of the present invention may be used by recreational bicyclists who wish to improve the aerodynamic efficiency of their vehicle. Moreover, the wheel cover of the present invention may also be used by touring cyclists intent on increasing the aerodynamic efficiency of their vehicle either for purposes of increasing velocity while racing, or for decreasing the amount of work necessary in traveling long distances. Another use of the wheel cover of the present invention is application to wheels for decorative purposes.

To this end, the wheel cover of the present invention may be easily applied and removed allowing full access to the wheel for repair or adjustment of rim, spoke, or hub. Additional applications for the wheel cover of the present invention include application to motorized vehicles such as motorcycles or automobiles as well as any other small three and four wheel vehicles having spoke wheels. In fact, the wheel cover of the present invention may be applied to any wheel having a somewhat irregular contour capable of creating less than favorable aerodynamic properties when rotated.

Generally, the wheel cover of the present invention may take on any shape, form, size, or other physical characteristics or properties suitable to increase the aerodynamic efficiency of the wheel to which it is applied. Preferably the wheel cover of the present invention is capable of providing this aerodynamic efficiency while maintaining the light weight aspect of the wheel.

Figure 2:
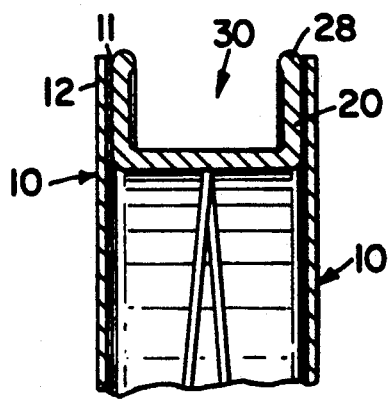
FIG. 2 is a side plan view of one embodiment of the wheel cover of the present invention shown in FIG. 1 with the wheel cover applied to a spoke wheel rim.

Turning to the individual elements of the wheel cover, FIGS. 1 and 2, the wheel cover outer edge 12 assists in affixing the wheel cover to the intended surface of application. To this end, the outer edge 12 may generally take any shape or character desired to complete this function. The wheel cover 10 may be patterned in any number of geometric shapes including oblong, square, triangular etc. in order to impart aesthetic as well as functional features to the wheel. It is also possible when using certain polymeric materials that more than one wheel cover be used on any given side of a wheel. In this instance, wheel covers may be overlaid on top of each other to impart any type of pattern or physical effect to the wheel.

Preferably, the outer edge 12 of the wheel cover is circular. A circular shape usually follows the contour of most wheels while obscuring or completely covering the majority of the spokes in the wheel. Depending upon the material chosen for the wheel cover, the outer edge 12 may have a thickness which assists in providing increased strength to assist in anchoring the cover 10 at this rim 20 of the wheel 5.

As shown in FIG. 1, the outer edge 12 of the wheel cover 10 is affixed to the wheel 5 at the rim 20. Alternatively, the wheel cover may be affixed to the wheel by attachment to the wheel spokes, see FIGS. 4 and 5, or, by friction fit between the wheel rim 20 and the tire 22, see FIG. 3.

The wheel cover of the present invention generally may also have an inner edge 14 which borders an aperture 16 at a central point which corresponds to the axle or hub 24 of the wheel 5, FIG. 1. This inner edge 14 and aperture 16 assists in allowing access to the wheel hub 24 for purposes of affixing or removing the wheel from the bicycle, as well as adjusting or repairing the wheel hub 24.

In concert with the function of the wheel cover of the present invention, the material used to make the wheel cover preferably has a thickness and strength suitable to withstand the environmental stress encountered in the application. Notably, the environmental stresses encountered by a bicycle wheel may be substantially different from those encountered by a motorcycle or automobile tire. Accordingly, materials used to make the wheel cover of the present invention should be chosen with the given application in mind.

To this end, the thickness of the wheel cover of the present invention should generally range from about 0.5 mils to 125 mils, preferably from about 1 mil to 60 mils, and most preferably from about 3 mils to 15 mils. These parameters are guidelines within which the wide variety of materials useful as wheel covers in the present invention may be used.

Moreover, depending upon the application, the wheel cover of the present invention should have a tensile strength ranging from about 100 psi to 40,000 psi, preferably from about 200 psi to 25,000 psi, and most preferably from about 300 psi to 15,000 psi. Here again, tensile strength of the material used to make the wheel cover will vary drastically depending upon the material used in making the cover. Moreover, it must be understood that the strength of the material will become more critical given increased environmental stress to the wheel to which the wheel cover is applied. Moreover, the materials used in the wheel cover of the present invention may be processed in accordance with methods known to those of skill in the art to generate a cover of appropriate thickness of strength.

Generally, materials which have been found useful in the wheel cover of the present invention include polymeric fiber and paper films. Polymeric films found useful in the present invention include those which comprise acrylics, cellulose, and cellulose derivatives, various elastomers including natural and synthetic rubbers, polyolefins and polyolefin derivatives, fluorinated hydrocarbon polymers, chlorinated hydrocarbon polymers, polyamides, phenolics, polycarbonates, polyesters, polyetherimides, polyethersulfones, polyetherketones, polyimides, polyethylenes, polypropylenes, polyphenylene sulfide, homopolymers and copolymers of styrene, polysulfone, polyureas, polyurethanes, silicones, vinyl esters and vinyl copolymers, acetyls, polybutylenes, as well as any other variety of thermoplastic or thermosetting compositions which may be sheeted as a film, produced as a foamed film, or in any other mode which is conducive to manufacturing the wheel cover of the present invention.

Other materials useful in manufacturing the wheel cover of the present invention include acrylonitrile-butadiene-styrene terpolymers, acrylonitrile-methacrylate copolymers; fluoroplastics such as polytrifluoroethylene copolymers, polytetrafluoroethylene, polyvinylfluoride, ethylene tetrafluoroethyl; polyamides such as the various nylons including nylon-6, nylon-6,6, nylon-11 and nylon-12; polybutylene; polycarbonates, polyesters, polyethylenes, including low density, medium density, high density and ultra high density molecular weight polyethylenes; ethylene copolymers including vinyl copolymers such as acetate, methylacrylates;

polypropylenes; polystyrenes; polyvinyl alcohol; polyvinylidene chloride; as well as both plasticized and nonplasticized polyvinyl chloride, and the like.

Other monomers useful in polymeric form which are suitable for forming the wheel cover of the present invention include vinyl unsaturated monomers including alpha olefins, and other olefinic hydrocarbons including ethylene, propylene, butylene, isobutylene, 1-hexene, 3-hexene, etc.; vinyl acetate and other vinyl carboxylic acid esters; acrylic monomers including acrylic acid, methacrylic acid, acrylamide, methacrylamide, methylacrylate, methylmethacrylate, hydroxyalkylacrylates, hydroxyalkylmethacrylates, butylacrylates, hexylmethacrylate, cyclohexylacrylate, etc.; alpha,beta-unsaturated dicarboxylic acids and anhydrides such as itaconic acid, aconitic acid, cynnamic acid, crotonic acid, mesaconic acid, malaeic acid, malaeic anhydride, fumaric acid, and the like; alpha,-beta-unsaturated dicarboxylic esters of dicarboxylic acids described above including aromatic esters, cycloalkyl esters, alkyl esters, hydroxylalkyl esters, alkoxyalkyl esters and others including mono-, bi-, and tricycloalkyl esters and heteroaromatic esters.

Tensile strength of the polymeric film generally depends upon filler and fiber content and orientation. Polymer orientation is generally alterable to achieve any number of physical effects within a sheet or film. Specifically, polymer orientation can be altered to affect the way a polymeric sheet or film performs under the application of any number of environmental forces such as heat, pressure, etc. Polymer orientation may also increase the tensile strength of polymers used in any given film when the polymers are aligned in the direction of stretch. Nucleating agents increase the crystallinity of the polymer and also increase the tensile strength of the polymer and influence the optical clarity and heat shrinking characteristics of the film. For example, high strength fibers are generally oriented or drawn after being formed. Drawing the polymer orients and crystallizes the polymer chains and has the net effect of producing a heat shrinking fiber with a significantly higher tensile strength and degree of crystallinity.

In accordance with one preferred embodiment of the present invention, the material used in the wheel cover is a heat shrinkable polymer. As noted earlier, heat shrinkability in polymeric films results from the orientation of the polymer chains during or after processing. To optimize the heat shrinking characteristics of a polymer, certain considerations must be addressed. The first is the thermal transition behavior of the polymer, e.g., glass transition and softening temperatures. A polymer can be heat shrinkable if it experiences a stressing environment before the polymer chains can reorient to an unstressed state. This behavior is time dependent and is more profound with certain polymer systems. Polyolefins are unique in their ability to retain their heat shrinking characteristics upon extended aging at ambient conditions.

Heat shrinking characteristics can be specifically designed into a film by either uniaxial or biaxial orientation. Uniaxial orientation results in a film that shrinks generally in the stretch direction, while biaxial films exhibit shrinkage in both planar and stretch directions. It is preferred that biaxially oriented films are used in the present invention, which avoids non-uniform recovery when the wheel cover is exposed to higher recovery temperatures.

Commercially available heat shrinking films consist of polymers such as polypropylene and polyethylene, that are capable of crystallizing. In practice, polypropylene is biaxially stretched or oriented at a temperature below its softening point. This process results in preferential alignment of the polymer chains in both the (x) or horizontal direction and (y) or vertical direction. During the stretching process, crystallization occurs which freezes the orientation within the molecular structure of the film.

Application of heat to the film melts the crystal phases within the film and results in the polymer chains recovering to their original dimensions. For example, heat shrinkable polyethylene films are produced using a lightly crosslinked polyethylene. Crosslinking can be accomplished by means such as radiation, free radical initiators and the like. After the crosslinked film is produced, the film is oriented which results in the crystallization of the polymer. The film is then capable of shrinking when it is subsequently heated above the crystalline melting point, which initiates dimensional recovery and the film shrinks.

The wheel cover of the present invention may also comprise a material which is stretch applied over the spokes and rim. Stretching the polymeric wheel cover during the adhesive bonding process results in orientation of the polymeric wheel cover. This orientation process induces stress which can cause crystallization of the polymer and therefore heat shrinking characteristics. Depending on the thermal transition behavior of the polymer, the recoverable stress may exhibit time dependence. Therefore, the polymer film may require that the heat shrinking step be performed immediately after the wheel cover has been bonded to the wheel to avoid transient loss of the shrinking behavior. After the wheel cover has been bonded to the wheel, heat can then be applied to the wheel cover to eliminate wrinkles and provide a smooth aerodynamic wheel cover.

In all, the preferred materials for the wheel cover of the present invention include polypropylene, polyethylene, polyurethane, and nylon films. Polyurethane and nylon substrates are preferred for stretch application processes, polypropylene and polyethylene are both preferred for heat shrinking application processes.

The wheel cover of the present invention may also comprise any number of natural or synthetic pulps which can be sheeted or otherwise formed into papers having sufficient thickness and strength for any given application in accordance with the present invention. Papers made from wood pulps are the most preferred materials used to make the wheel cover of the present invention. Wood pulps which are either manufactured by mechanical or chemical processes known to those of skill in the art may also be used to manufacture paper films suitable for use with the wheel cover of the present invention. Natural or synthetic cellulosic products which may be used to form the wheel cover include modified cellulosics including ethyl cellulose, cellulose acetate, cellulose acetate butyrate, cellulose propionate, cellulose triacetate and the like.

Additionally, the papers useful in the preparation of the wheel cover of the present invention also include wood pulps combined with synthetic inorganic fibers or polymers. Utilization of inorganic fibers such as asbestos or glass as well as synthetic organic polymers such as polyamides (nylon) and polyolefins in combination with cellulose may also provide papers useful in making the wheel cover of the present invention.

Additionally, the wheel cover of the present invention may also be made from any variety of natural or synthetic fibers woven into fabrics. Generally, fibers which are useful in manufacturing the wheel cover of the present invention include carbon fibers, aramide fibers, natural fabric fibers including cotton, wool, synthetic fibers including those already mentioned, glass fibers, ceramic fibers, thermoplastic fibers or mixtures thereof may all be used in manufacturing the wheel cover of the present invention.

Nonwoven fabrics may also be useful in forming the wheel cover of the present invention. Nonwovens by definition are fibrous materials that are produced by randomizing fibers which are followed by a fiber bonding step. The bonding step ties the fibers together and is equivalent to weaving fibers which is a mechanical approach towards achieving strength. A typical nonwoven is TYVEK ® available from E. I duPont deNemours & Company.

Fabrics useful in construction of the wheel cover of the present invention also include those fabrics woven from materials such as acetate fibers made from cellulose acetate and triacetate; acrylic fibers having acrylonitrile units; aramide fibers; azlon fibers; polyamide fibers having aromatic rings; vinylidene dinitrile fibers; various olefinic fibers such as ethylene, propylene or other olefin unit type fibers; polyester fibers generally comprising substituted aromatic carboxylic acid units such as terepthalate units and para-substituted hydroxybenzoate units; RAYON ® which is merely regenerated cellulosic units; SARAN ® which is a fiber comprising a major portion of vinylidene chloride; SPANDEX ® fibers generally comprising a major portion of segmented polyurethane; VINOL ® type fibers comprising a major portion of vinyl alcohol and vinyl acetal units; VINYLIN ® fibers generally comprising a major portion of vinyl chloride units and the like.

Other fibers which may be useful in manufacturing the wheel cover of the present invention include elastomeric fibers such as fibers made from natural rubbers and urethane polymers. These fibers provide a wheel cover which has a smooth and stable body which allows stretch application to any variety of spoke wheels in a manner which will promote the contouring of the wheel cover to the outer side of the wheel.

The preferred structure for the wheel cover of the present invention includes polyolefins and their derivatives, polyamides, polyesters, and polyurethanes as well as woven and nonwoven fabrics such as polyamides, polyolefins and cellulose. In certain instances, for example when using rigid polyester, prefabrication may be desired to achieve a wheel cover that conforms to the wheel in an efficient manner.

Adhesive

The wheel cover of the present invention is capable of being friction fit between the wheel tire and the wheel rim. The wheel cover of the present invention may also be affixed to the wheel by various physical or chemical adhesive means. Physical adhesive means include mechanisms such as velcro and the like when applied between rim and cover or between two opposing wheel covers positioned over the spokes of the same wheel. When physical adhesive mechanisms such as friction fitting the wheel cover between the tire and rim are used, the cover is generally held in place by the tension between the rim and wheel tire. When velcro is used, the wheel cover may generally have a velcro strip placed on the outer edge of the inside of the wheel cover. The complementary velcro strip may be placed on the wheel rim or, in the alternative, on a wheel cover which is designed to meet the first wheel cover through openings in the spokes. In this instance, the complementary wheel covers are held in place by the alternatively diverging pattern of the spokes as they traverse from the rim towards the hub in combination with the alternating pattern of the spokes.

Chemical adhesive means include adhesive coated fabric or polymeric tapes, pump or aerosol spray adhesives and the like. Chemical adhesives may either comprise water or solvent soluble systems which are pressure sensitive, permanently cured, or are otherwise releasable through the application of physical force, aqueous or organic solvents or other adhesive releasing means known to those of skill in the art.

Figure 3:
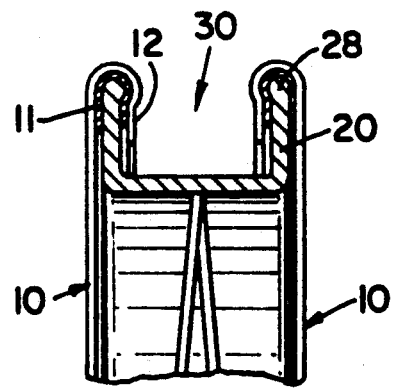
FIG. 3 is an alternative embodiment of the wheel cover of the present invention shown in FIG. 1 with the wheel cover applied in this instance to facilitate friction fitting the wheel cover between the interior of the rim and a later applied wheel tire (not shown).

Generally, the adhesive 11, FIGS. 2 and 3, functions to secure the wheel cover of the present invention to the wheel spokes or rim. Depending upon whether the wheel cover is intended to be permanently positioned upon the wheel or removable after certain period of time, the choice of adhesives may be varied across a broad range of adhesives known to those of skill in the art. Included within those useful in affixing the wheel cover of the present invention are natural and synthetic adhesives and resins. Naturally occurring adhesives include starch, dextrins, vegetable gums, proteins, as well as other natural compositions including asphalts, shellacs, natural rubbers, and inorganic materials having a natural tack or adhesion.

Synthetic adhesives generally include thermoset and thermoplastics. Thermoplastic adhesives or resins useful in affixing the wheel cover of the present invention include cellulosic esters or ethers, alkyds and acrylic esters, polyamides, polystyrenes, synthetic rubbers, polyvinyl alcohols, and polyvinyl alcohol derivatives.

Other types of thermoplastic adhesives useful in attaching a wheel cover of the present invention to a wheel include polyamides, polycarbonates, polyesters, polyolefins such as polyethylene, polypropylene, including polar copolymers and terpolymers of both polyethylene and polypropylene; and polyvinyl acetate. Other types of thermoplastic adhesives include natural and synthetic rubber based adhesives such as adhesives comprising butadiene acrylonitrile rubber, butylene polyacrylate, butadiene styrene rubber, butyl rubber, chlorinated rubber, chlorobutyl rubber, cyclized rubber, depolymerized rubber, natural rubber, polybutadiene, polychloroprene, polyisobutylene, polyisoprene, polysulfide, polyurethane rubber, silicone rubber and combinations thereof.

Thermosetting adhesives generally useful in the present invention include any thermoset which may be applied to the wheel cover of the present invention to securely affix the wheel cover to the wheel. For example, thermoset adhesives useful in the present invention include those adhesives comprising epoxies, furans, melamine formaldehydes, phenol formaldehydes, phenolics, polyesters, polyethyleneimines, polyisocyanates, polyurethanes, silicones, acrylics, or any other thermoset adhesive which may be cured by means such as heat, curing agents, radiation, solvents, evaporation and the like.

Also particularly useful in the present invention are pressure sensitive adhesives. Pressure sensitive adhesives are generally classified as those adhesives which have a high degree of tack and an extended, if not infinite, open time before that tack leaves the system. Pressure sensitive adhesives useful in the present invention include any of those thermoplastic adhesives which may be formulated so as to provide an adhesive composition having an extended open time and a high degree of tack.

Pressure sensitive adhesives and tapes are preferred adhesives for the application of a wheel cover of the present invention. These adhesive means provide acceptable shelf life and open times which allow for easy application. Acrylic and rubber resin base pressure sensitive adhesives are two systems that are particularly preferred depending upon the composition of the wheel cover. Tackified rubber resin adhesives have been found to work particularly well with polypropylene and polyethylene based wheel covers.

Applications

The wheel cover of the present invention may be used on any variety of vehicles having wheels, including motorized as well as nonmotorized vehicles. In application, the wheel cover of the present invention is generally applied through a two or three step process. First, if the wheel cover is to be applied through the application of an adhesive, the adhesive system is either applied to the wheel rim or the outer edge of the wheel cover.

As can be seen in FIG. 2, a wheel cover 10 has been applied to the wheel rim by means of adhesive 11. A wheel cover 10 rests on either side of the wheel rim 20 and runs to the edge 28 of the rim which ultimately houses a wheel tire (not shown). Application of the adhesive system to the wheel rim 20 is generally followed by attachment of the wheel cover 10 to the adhesively coated rim 20. Depending on the adhesive used to affix the wheel cover to the rim, the wheel cover 10 may be held in place during the curing phase if necessary.

The wheel cover of the present invention may also be applied through the complementary application of adhesive and friction fit. A friction fit of the wheel cover may be completed between the wheel rim 20 and the tire, FIG. 3. In this instance, the wheel cover outer edge 12 runs over and around the edge 28 surface of the rim into the tire seating area 30 of the rim 20. The adhesive 11 runs from the outside of the rim onto the top of the rim and into the tire seating area 30. The wheel cover 10 is now structurally held in place on the rim 22 by the adhesive 11. However, once the tire is applied and inflated in the tire seating area 30 of the wheel rim 20, the force between the tire on the wheel rim 20 will hold the outer edge 12 of the wheel cover 10 and, in turn the wheel cover 10 generally, in place on the wheel.

Figure 4:
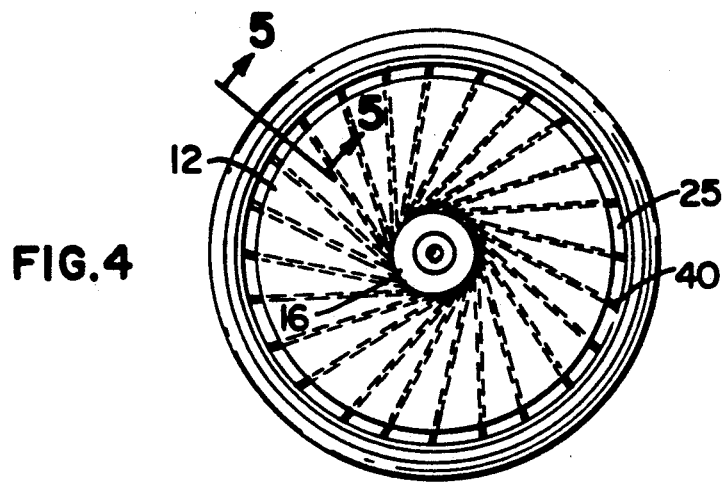
FIG. 4 is an alternative embodiment of the wheel cover of the present invention shown generally attached to a spoke wheel at the spokes.
Figure 5:
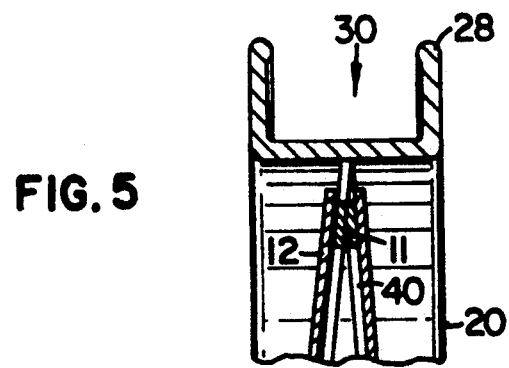
FIG. 5 is a cut away view of the wheel covers of the present invention shown in FIG. 4 taken along lines 5—5.

An additional alternative for affixing the wheel cover of the present invention to a spoke wheel can be seen in FIGS. 4 and 5. In this instance, the wheel cover 10 is affixed to spokes which converge from either side of the hub 24 onto the rim 20. As can be seen in FIG. 4, there is a slight open space 25 between the base of the rim 20, and the outer edge 12 of the wheel cover 10. Turning to FIG. 5, one can see that complementary wheel covers 10 oppose each other through an adhesive interface at the spokes 40. When a pair or complementary set of wheel covers 10 are applied adhesively to the spokes of a wheel, the spokes of the wheel are effectively sandwiched within the wheel covers 10. The spokes provide a positive means of radial engagement when combined with the adhesive which encapsulates the skewed spokes supporting the wheel cover. This allows the skewed geometric arrangement of spokes combined with the diverging angle of opposing spokes to provide a means of radially anchoring the wheel cover in place with the assistance of the adhesive system. In this instance, the wheel covers 10 of the present invention maintain a smooth aerodynamic surface over the face of the wheel without interfering with application or removal of the tire from the rim in addition to allowing access to the spokes for purposes of truing or replacement. Additionally, as can be seen in FIG. 4, by leaving a large central aperture 16 in the wheel cover 10, ready access can be obtained to the hub in order to repair or adjust the hub.

WORKING EXAMPLES

Working Examples were undertaken to measure the applicability of certain materials as wheel covers in accordance with the present invention.

WORKING EXAMPLE 1

A pressure sensitive two-sided foam tape sold under the brand name MAGIC MOUNTS ® mounting tape by Miller Studio, Inc. was applied to the outer perimeter of a circular disk of SARAN ® packaging film. A center cut out was provided to allow for wheel hub access. The protective liner of the tape was removed and the article was applied to a bicycle wheel within the circumference of the wheel rim using the individual spokes as points of contact. The point of contact on the spoke was just below the wheel rim. The article was applied by attaching the tape to the spokes at points of contact 180° opposite one another, working around the inside circumference of the wheel rim until all spokes were in contact with the wheel cover. An identical complementary cover was then applied to the opposite face of the wheel using the same tape to bond the cover to the complementary tape surface.

WORKING EXAMPLE 2

The same tape used in Working Example 1 was then cut in to lengths that were sufficient to span the distance between individual spokes, allowing just enough space between the tape strips for the spoke to rest. This approach minimized the corrugated effect produced by sandwiching the spokes between two thicknesses of tape. The same film used in Example 1 was then fastened to the exposed tape surface. Fastening was accomplished by working around the inside perimeter of the wheel rim until the entire cover was effectively fastened to the inside of the wheel. Sufficient care was required to provide a wrinkle-free wheel cover. Excess film was then trimmed from the circumference of the wheel cover to the point of the adhesive contact.

WORKING EXAMPLE 3

Cyanoacrylate adhesive, sold under the brand name KRAZY GLUE ® was used to fasten several different covers to a bicycle wheel. Two methods were used: the first used the rim as a bonding site, and the second method relied on the spokes as individual bonding sites to secure the cover to the wheel. Both methods required center cut outs to provide hub access. Common porous cotton and nylon fabrics were used effectively as the protective aerodynamic wheel cover. Some effort was required to impart sufficient tension to the fabric and provide a complementary flat cover without destroying the mechanical integrity of the cover. These examples demonstrated that a cover can be constructed that will be permeable to air. This is an important aspect to consider for bicycles where cross winds can impart a substantial lateral force that can create handling problems for the cyclist.

WORKING EXAMPLE 4

A triangular shaped wheel cover with the center cut out to provide hub access was then applied to a wheel. The cover was constructed from a heat shrinkable polyolefin film. Tape was attached to the apex points of the triangle. The tape liner was removed and the three adhesive sites were fastened to the spokes. As an identical complementary cover was then applied to the opposite face of the wheel in a mirror image fashion. The adhesive contact points were positioned to encapsulate the spoke on either side within the adhesive contact point. Heat was then used to shrink the covers and achieve a wrinkle-free condition. This example demonstrates that design can play a part in providing a stylish wheel cover that is capable of individualizing the bicycle to meet a wide variety of consumer tastes.

The foregoing specification, examples and data provide a basis for the understanding of the invention. The invention can be made on a variety of embodiments without departing from the spirit and scope of the invention. Accordingly, the invention resides in the claims hereinafter appended.

I claim as my invention:

1. A heat shrinkable aerodynamic wheel cover comprising
   (a) a two sided circular cover, said cover comprising a polyolefin material, said cover comprising an outer edge and an inner edge, said inner edge bordering a central aperture;
   (b) adhesive means deposited on one side of said aerodynamic wheel cover, said adhesive means positioned adjacent to the wheel cover outer edge wherein said polyolefin material does not interfere with the mechanical operation of the wheel and has a tensile strength of about 200 to 25,000 psi.

2. The aerodynamic wheel cover of claim 1, wherein said cover thickness ranges from about 0.5 mils to about 125 mils.

3. The aerodynamic wheel cover of claim 1 wherein said adhesive means comprises an adhesive selected from the group consisting of velcro, adhesive tape, or an adhesive resin.

4. The aerodynamic wheel cover of claim 3, wherein said adhesive means comprises an adhesive selected from a group consisting of natural or synthetic thermoplastics, and thermosets.

5. The aerodynamic wheel cover of claim 4, wherein said thermoplastic adhesive comprise a pressure sensitive adhesive.

6. The wheel cover of claim 4, wherein said thermoplastic adhesives are selected from the group consisting of polyamides, polycarbonates, polyesters, polyolefins, polyvinyl acetates and combinations thereof.

7. The aerodynamic wheel cover of claim 4, wherein said thermoset adhesives are selected from a group consisting of epoxies, phenolics, isocyanates, cyanoacrylates, acrylics or combinations thereof.

8. The wheel cover of claim 1 wherein said cover has a thickness of about 1 mil to 60 mils.

9. The cover of claim 1 wherein said cover has a thickness ranging from about 3 mils to 15 mils.

10. The cover of claim 1 wherein said polyolefin material has a tensile strength ranging from about 300 psi to 15,000 psi.

11. The cover of claim 1 wherein said polyolefin material comprises polypropylene.

12. The cover of claim 1 wherein said polyolefin material comprises polyethylene.

13. A vehicle wheel comprising
   (a) a wheel rim;
   (b) a hub positioned within the circumference of said rim;
   (c) a plurality of spokes extending inwardly from said rim to said hub; and
   (d) at least one heat shrinkable aerodynamic wheel cover affixed to the wheel, said wheel cover comprising a two sided circular cover, said cover comprising a polyolefin material having a tensile strength of about 200 to 25,000 psi, said cover comprising an outer edge and an inner edge, said inner edge bordering a central aperture adjacent said wheel hub, and adhesive means deposited on one side of said aerodynamic wheel cover, said adhesive means positioned adjacent to the wheel cover outer edge wherein said wheel cover does not interfere with the mechanical operation of the wheel.

14. The vehicle wheel of claim 13, wherein said wheel cover outer edge is attached to the rim through said adhesive means.

15. The vehicle wheel of claim 13, wherein said wheel cover outer edge is attached by fixing said adhesive means to said spokes.

16. The vehicle wheel of claim 13, comprising a second heat shrinkable wheel cover positioned over the second side of the wheel.

17. The vehicle wheel of claim 16, wherein said first and second wheel cover outer edge is attached by fixing said adhesive means to said spokes.

18. The wheel cover of claim 13 wherein said cover has a thickness of about 1 mil to 60 mils.

19. The cover of claim 13 wherein said cover has a thickness ranging from about 3 mils to 15 mils.

20. The cover of claim 13 wherein said polyolefin material has a tensile strength ranging from about 300 psi to 15,000 psi.

21. The cover of claim 13 wherein said polyolefin material comprises polypropylene.

22. The cover of claim 13 wherein said polyolefin material comprises polyethylene.

23. A method of applying a heat shrinkable aerodynamic wheel cover to a vehicle wheel, said vehicle wheel comprising a rim and hub, said aerodynamic wheel cover comprising a two sided circular cover, said cover comprising a polyolefin material having a tensile strength of about 200 to 25,000 psi, said cover comprising an outer edge and an inner edge, said inner edge bordering a central aperture, and adhesive means deposited on one side of said aerodynamic wheel cover, said adhesive means positioned adjacent to the wheel cover outer edge wherein said wheel cover does not interfere with the mechanical operation of the wheel, said method comprising the steps of:
   (a) stretch applying the aerodynamic wheel cover to a hub and rim wheel; and
   (b) heat shrinking said wheel cover after application.

24. The method of claim 23, additionally comprising the step of applying a second cover to said wheel.

25. The method of claim 24, wherein said wheel covers are adhesively applied to said spokes.

26. The cover of claim 23 wherein said cover has a thickness ranging from about 3 mils to 15 mils.

27. The cover of claim 23 wherein said polyolefin material has a tensile strength ranging from about 300 psi to 15,000 psi.

28. The cover of claim 23 wherein said polyolefin material comprises polypropylene.

29. The cover of claim 23 wherein said polyolefin material comprises polyethylene.

* * * * *